(12) United States Patent
Shimazaki

(10) Patent No.: US 6,677,723 B2
(45) Date of Patent: Jan. 13, 2004

(54) CIRCUIT FOR DRIVING STEPPING MOTOR

(75) Inventor: Hiroyuki Shimazaki, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 59 days.

(21) Appl. No.: 09/973,003

(22) Filed: Oct. 10, 2001

(65) Prior Publication Data

US 2002/0041170 A1 Apr. 11, 2002

(30) Foreign Application Priority Data

Oct. 11, 2000 (JP) ........................................ 2000-310455

(51) Int. Cl.$^7$ ............................... H02P 8/00; H02P 7/00
(52) U.S. Cl. ...................................... 318/696; 318/490
(58) Field of Search ................................ 318/685, 490, 318/696, 688; 340/870.02, 936, 973, 978, 686.3, 815.78, 815.87; 116/37, 47, 62.1

(56) References Cited

U.S. PATENT DOCUMENTS

| | | | | |
|---|---|---|---|---|
| 4,291,268 A | * | 9/1981 | Okuyama | 324/76.11 |
| 5,546,888 A | * | 8/1996 | Skiver et al. | 318/696 |
| 5,665,897 A | * | 9/1997 | Lippmann et al. | 73/1.01 |
| 5,847,531 A | * | 12/1998 | Hoffsommer et al. | 318/696 |
| 5,877,694 A | * | 3/1999 | Kataoka | 340/688 |
| 5,914,579 A | * | 6/1999 | Komm | 318/696 |
| 5,932,987 A | * | 8/1999 | McLoughlin | 318/696 |
| 6,034,501 A | * | 3/2000 | Sato et al. | 318/696 |
| 6,204,625 B1 | * | 3/2001 | Seno | 318/685 |

FOREIGN PATENT DOCUMENTS

JP 06038593 A * 2/1994 .............. H02P/8/00

* cited by examiner

Primary Examiner—Kimberly Lockett
Assistant Examiner—Patrick Miller
(74) Attorney, Agent, or Firm—Armstrong, Kratz, Quintos, Hanson & Brooks, LLP

(57) ABSTRACT

A circuit for driving a stepping motor, in which excitation signals corresponding to an over maximum needle indicating angle toward a zero position at a timing of a car battery ON and excitation signals corresponding to twice that of one electric cycle for rotating a needle toward a zero position at a timing of turning ignition ON or OFF as supplied to drive coils, thereby eliminating sensing induced voltage and sensing coils to set a zero position and shorten extremely a time for returning a needle to a zero position with reducing vibrated motion and simplify the circuit structure and miniaturize unit size.

7 Claims, 5 Drawing Sheets

CIRCUIT FOR DRIVING STEPPING MOTOR

BACKGROUND OF THE INVENTION

1. Field of the Invention

The present invention relates to a circuit for driving a stepping motor to return efficiently a needle of a meter used especially in a vehicle to a zero position when starting to drive.

2. Description of the Related Art

Meters mounted in a vehicle, such as a speedometer to indicate a vehicle drive speed or a tachometer to indicate an engine rotation speed or the like have recently used a stepping motor to meet the requirement of response speed or indicating accuracy. However, for indicating preciously with a stepping motor, synchronizing of timing, on which a stopper piece rotating together with a stepping motor abuts on a fixed stopper, and a specific step of excitation signals to drive the stepping motor is required.

Such synchronization is usually accomplished by sensing a timing on which said stopper piece abuts on the fixed stopper to monitor induced voltage in coils by a stepping motor rotation when a battery is turned ON or ignition is switched ON/OFF.

Operation of the return of a needle or a stopper piece to a zero position defined by a fixed stopper and synchronizing a timing to abut on the fixed stopper with a specific step of excitation signals is called a "return-to-zero process" or simply "return-to-zero" herein.

SUMMARY OF THE INVENTION

The method of sensing induced voltage in the prior art, as mentioned above, has several drawbacks, such as requiring much time for return-to-zero process at battery turn on; needle continuously oscillating each time the ignition is turned ON/OFF; requiring much time for return-to-zero because of the necessity for keeping suitable rotating speed of a rotor to sense induced voltage securely; indication error caused by an inaccurate stepping motor; imprecise judging to abut on a stopper by means of unclear distinction of induced voltage level on a stepping motor with a rotor of a large numbers of magnetized poles and a large reduction gear ratio or complicated circuit required by induced voltage sensing coil and a sensing circuit.

The present invention has been accomplished to overcome the above drawbacks and an object of the present invention is to provide a drive circuit for a stepping motor to eliminate sensing function for induced voltage and to reduce any oscillatory motion of a needle on return-to-zero process and to reduce process time with a simple circuit structure.

In order to attain the above objects, a drive circuit for a stepping motor according to the present invention controls a position of a needle of a meter mounted in a vehicle by needle control signals and comprises an excitation signal generating means for generating excitation signals, wherein one electrical cycle is formed by a plurality of excitation steps supplied in drive coils to rotate a rotor with N-poles and S-poles, magnetized equally and alternately, of a stepping motor and a first excitation signal supply controlling means for controlling the excitation signal generating means to supply the excitation signals to the drive coils, wherein said needle is connected to the rotor through a speed change gear and rotates correspondingly to the rotor rotation, so that the excitation signals correspond to a needle rotating angle more than a maximum needle rotating angle toward a zero position to respond to the needle control signals generated at a timing when a vehicle battery turns ON.

According to the present invention, the excitation signals corresponding to rotating the needle with an angle more than the maximum needle rotating angle toward a zero position are supplied to the drive coils by means of controlling the excitation signal generating means with the first excitation signal supply controlling means at a timing when a car battery turns ON. When the excitation signals corresponding to an angle more than the maximum needle rotating angle are supplied to the drive coils, the needle is always set at the zero position.

Therefore, setting a zero position is accomplished without sensing induced voltage and then a time for returning the needle to the zero position is extremely shortened. Then, the circuit structure becomes simpler and unit size becomes smaller because sensing coils for induced voltage and sensing circuit are not required. Furthermore, in case of using an inaccurate stepping motor or a stepping motor with a rotor have a large number of magnetized poles and a large reduction gear ratio, return-to-zero can be done securely. Furthermore, when connecting a vehicle battery or replacing it, the present invention is very effective to set a zero position of a stepping motor.

In order to attain the objects, a circuit for driving a stepping motor according to the present invention is for controlling a needle position of a meter mounted in a vehicle by needle control signals and comprises an excitation signal generating means for generating excitation signals, wherein one electrical cycle is formed by a plurality of excitation steps supplied in drive coils to rotate a rotor with N-poles and S-poles, magnetized equally and alternately, of a stepping motor and a first excitation signal supply controlling means for controlling the excitation signal generating means to supply the excitation signals to the drive coils, wherein said needle is connected to the rotor through a speed change gear and rotates correspondingly to the rotor rotation, so that said excitation signals correspond to twice said one electrical cycle rotating toward a zero position to respond to the needle control signals generated at a timing when an ignition turns ON or OFF.

According to the present invention, the excitation signals corresponding to twice one electrical cycle rotating the needle toward a zero position are supplied to the drive coils by means of controlling the excitation signal generating means at a timing of turning ignition ON or OFF by the first excitation signal supply controlling means. When the excitation signals corresponding to twice one electrical cycle are supplied to the drive coils, the needle is almost usually set at the zero position.

Therefore, setting a zero position is accomplished without sensing induced voltage and viewing improves because a needle is not oscillating continuously each time the ignition is turned ON/OFF. Furthermore, the circuit structure becomes simpler and unit size becomes smaller because sensing coils for induced voltage and sensing circuit are not required.

In order to attain the objects, a drive circuit for a stepping motor according to the present invention has an excitation signal generating means, comprising a filtering means for filtering the needle control signals to move the needle faster to the zero position, and a SIN/COS table for generating SIN/COS data corresponding to the excitation signal of micro-steps based on filtering result by means of the filtering means and an output circuit for outputting excitation signals supplied into the drive coil as a required voltage value to rotate the rotor based on SIN/COS data by the SIN/COS table.

According to the present invention, because the excitation signal of micro-steps is supplied into the drive coil by the filtering means, the SIN/COS table and the output circuit in the excitation signal generating means, the oscillatory motion of the needle during return-to-zero is reduced. Because the vibrated motion of the needle becomes small, the needle oscillation may cease completely.

In order to attain the above objects, the drive circuit for a stepping motor according to the present invention, has a filtering means comprising a first filter for filtering the needle control signals to add or subtract predetermined value corresponding to change values of the needle control signals, a second filter for smoothing data change value to weighted-average filtering results by the first filter every predetermined time period and a third filter for weighted-averaging filtering results by the second filter every predetermined time period to prevent out-of-step of a stepping motor and sending the data to the SIN/COS table.

According to the present invention, because the needle control signals are filtered by two steps of the first filter and the second filter, the change values of the needle control signals are smoothed. Furthermore, out-of-step of a stepping motor is prevented by weighted-averaging two steps filtered needle control signals by the third filter. Thus, return-to-zero is done smoothly and securely.

In order to attain the above objects, the rotor is magnetized equally and alternately in N-pole and S-pole to pair of 5 poles, wherein the excitation signals is generated to be formed with equally-divided 32 excitation steps, based on a sine wave shape.

According to the present invention, the rotor is magnetized equally alternately in N-pole and S-pole to pair of 5 poles and the excitation signals are generated to be formed with equally-divided 32 excitation steps and then return-to-zero is performed smoothly as shown in FIGS. 6 and 7.

In order to attain the above objects, the drive circuit for a stepping motor according to the present invention comprises a second excitation signal supply controlling means for controlling the excitation signal generating means to supply to the drive coils the excitation signals for moving the needle in an amount based on a measured signal toward the zero position or counter to the zero position, in response to the needle control signals generated based on the measured signals supplied by a measurement unit in a vehicle.

According to the present invention, the second excitation signal supply controlling means controls the excitation signal generating means to supply to the drive coils the excitation signals for moving the needle in an amount based on a measured signal. The similar excitation signals used for return-to-zero can be also used for indicating in a meter, responding normal measured signals. Therefore, the same rotation controlling of the rotor is applied on return-to-zero and normal condition and then the processing can be simplified and a CPU load for rotation controlling of a rotor is enhanced.

In order to attain the above objects, the drive circuit for a stepping motor according to the present invention comprises the drive circuit for a stepping motor mentioned above, wherein an amount of the excitation signal corresponding to rotating the needle more than the maximum needle rotating angle is the amount to rotate the needle 360 degree.

According to the present invention, the excitation signal corresponding to rotating the needle 360 degree toward the zero position is supplied to the drive coils. Therefore, a needle of any meter is always set on the zero position securely since usually a needle does not rotate over 360 degree in maximum and the excitation signal corresponding to rotating the needle 360 degree is supplied into the drive coils.

BRIEF DESCRIPTION OF THE DRAWINGS

FIG. 6 is a graph, showing an example of angle control by return-to-zero processing at battery ON; and FIG. 7 is a graph, showing an example of angle control by return-to-zero processing at ignition ON.

DETAILED DESCRIPTION OF THE PREFERRED EMBODIMENT

A preferred embodiment of this invention will now be described with reference to the attached drawings.

Figure 1:
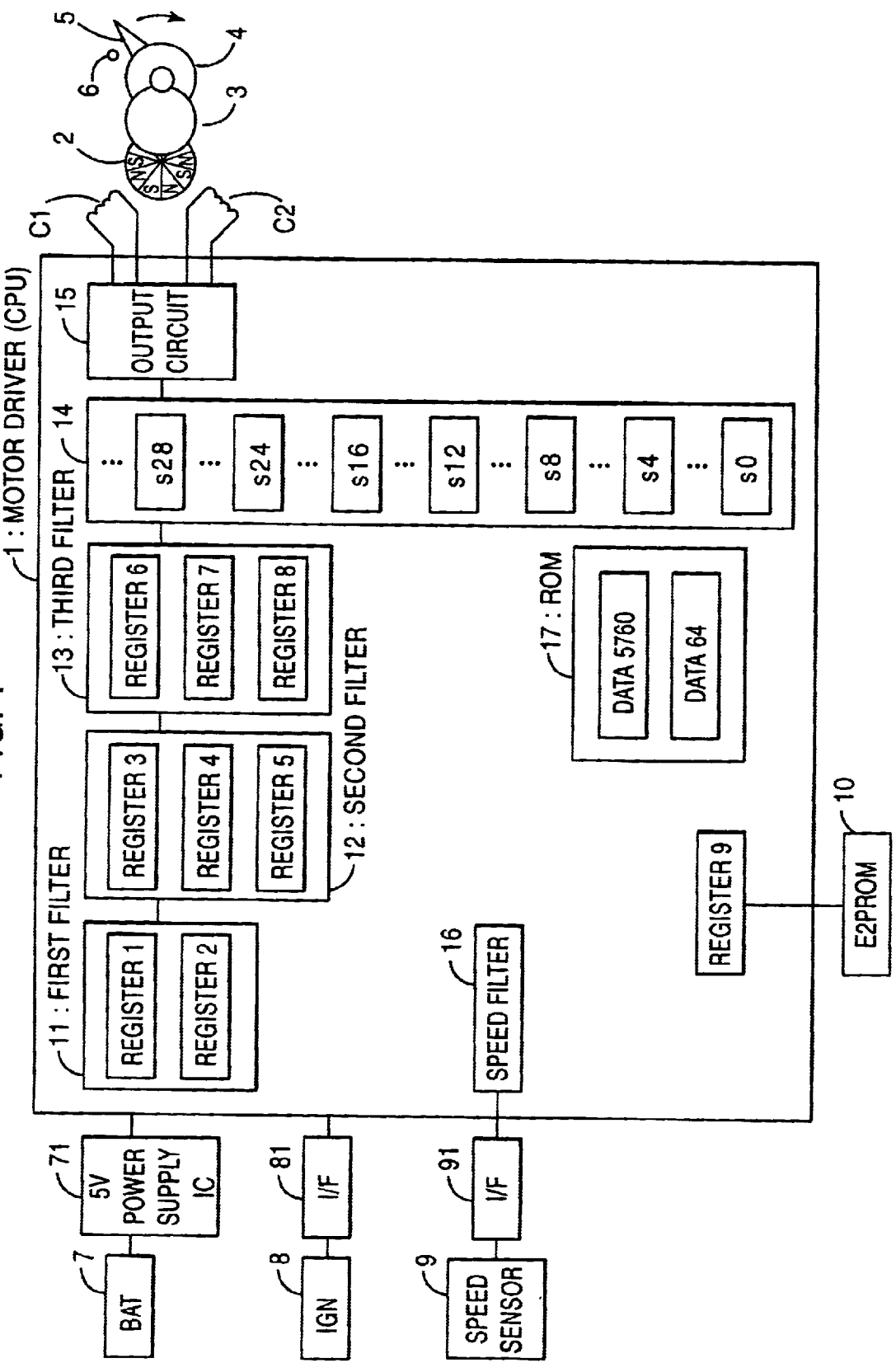
FIG. 1 is a block diagram, showing a preferred embodiment of the present invention.

FIG. 1 is a whole block diagram, showing a preferred embodiment according to the present invention.

In FIG. 1, a motor driver 1 for driving a stepping motor supplies excitation signals to drive coils C1, C2 for rotating a rotor 2. The excitation signals are formed with equally-divided 32 excitation steps generated fundamentally based on sine and cosine wave shapes, to be described in more detail later. The motor driver 1 comprises a CPU for filtering process, later described, and data conversion as basic functions of the driver 1 and then the motor driver 1 may be described as a driver CPU or simply CPU in later some descriptions.

The rotor 2, driven by the drive coils C1, C2 placed 90 degrees apart from one other, is magnetized equally alternately in N-pole and S-pole to pair of 5 poles, herein. The rotor 2 is connected with an intermediate gear 3 and an output gear 4. The output gear 4 is provided with a needle or a stopper piece 5.

The needle or the stopper piece 5 rotates together with rotation of the rotor 2 corresponding to excitation signals at a zero position determined by a fixed stopper 6 and indicates a (not-shown) required scale. For example, the needle or the stopper piece 5 rotates clockwise, as shown by an arrow when accelerating speed and inversely rotates counterclockwise by an inverse direction of an arrow when decelerating.

The motor driver 1 is connected to an ignition switch 8 (IGN 8) through I/F 81 and with a speed sensor 9 through I/F 91. The motor driver 1, responding to ING 8 turning ON or OFF, generates excitation signals to return the needle or stopper piece 5 to a zero position and supplies the signals to the drive coils C1 and C2. The motor driver 1 also receives a sensor output (speed pulse) corresponding to a vehicle speed from the speed sensor 9 and generates excitation signals to move the needle or stopper piece 5 correspondingly to a vehicle speed and supplies the signals to the drive coils C1 and C2.

The motor driver 1 is supplied electric power through a 5V power supply IC 71 from a car battery 7. The motor driver 1 generates excitation signals to return the needle or stopper pieces 5 to a zero position at a timing of the power supply IC 71 turning ON or the IGN 8 turning ON or OFF and supplies the signals to the drive coils C1 and C2, later described more with reference to FIGS. 2–7.

The motor driver 1 is connected with a E2PROM 10. The E2PROM 10 is a rewritable memorizing means and stores data of corresponding relation between timing of the needle or stopper piece 5 abutting on the fixed stopper 6 and later-described a stable step of excitation signals.

In the preferred embodiment, the motor driver 1 controls only one kind of motor elements or devices (drive coils C1, C2, C3, C4, C5 and C6) corresponding to a speedometer. Preferably, controlling a tachometer, a fuel meter, a thermometer or the like including the speedometer by a time sharing control method is possible.

The motor driver 1 is provided with a first filter 11, a second filter 12, a third filter 13, a SIN/COS table 14, an output circuit 15, a speed filter 16, a ROM 17 and registers 1–9. The motor driver 1 is basically structured with a CPU and generates excitation signals to drive a stepping motor.

The first filter 11 controls the maximum motor rotating speed and, when a remainder of subtracting the absolute value of previous angle data from the absolute value of new angle data is positive and 8 degrees more, the first filter 11 adds 8 degrees to previous angle data and sends the data to the second filter 12 or, when the remainder is not over 8 degrees, the first filter 11 sends the new angle data to the second filter 12. When a remainder of subtracting the absolute value of previous angle data from the absolute value of new angle data is negative and 8 degrees or more, the first filter 11 subtracts 8 degrees from previous angle data and sends the data to the second filter 12 or, when the remainder is not over 8 degrees, sends the new angle data to the second filter 12.

The second filter 12 is for smoothing a motor rotation and smooths data changing every about 20.48 msec by $\frac{1}{8}$ weighted-average filtering and sends the data to the third filter 13.

The third filter 13 is for smoothing more a motor rotation and smooths data changing every about 0.256 msec by $\frac{1}{512}$ weighted-average filtering to prevent out-of-step of a stepping motor. Thereafter, a remainder of the data divided by 32 is sent to the SIN/COS table 14.

Two steps filtering by the first filter 11 and the second filter 12, as mentioned above, smooths data changing very much. Furthermore, weighted-average filtering by the third filter 13 prevents a stepping motor from getting out-of-step. Therefore, return-to-zero can be done securely and smoothly.

The SIN/COS table converts output data to drive coils C1, C2 and sends output data to C1, C2 (SIN/COS conversion data) corresponding to received data from the third filter 13 to the output circuit 15. S0, s4, s8, s12, s16, s20, s24 and s28, described in the table 14, show step numbers by every 4 steps in 32 steps forming said excitation signals.

Actually, one electric cycle of excitation signals is formed with 32 steps of divided equally s0, s31, s30, s29, s28, s27, s26, s25, s24, s23, s22, s21, s20, s19, s18, s17, s16, s15, s14, s13, s12, s11, s10, s9, s8, s7, s6, s5, s4, s3, s2 and s1. Then, there are more steps between above each 4 steps, for example, s2 and s3 between s0 and s4, however, steps between each 4 steps are omitted for simplifying the description herein.

The output circuit 15 supplies excitation signals of a motor controlling output to the drive coils C1, C2 and supplies voltage values of D/A or PWN conversion data from the SIN/COS table 14 to the coils C1, C2.

Because micro-step excitation signals are supplied to drive coils by means of the filter 11, 12, 13, the SIN/COS table 14 and the output circuit 15 as mentioned above, the oscillatory motion of the needle during return-to-zero is reduced. Because the oscillatory motion of the needle becomes small, the needle oscillations may cease completely.

The excitation signals supplied to the coils C1, C2 from the output circuit 15 are formed into a wave shape based on two sine waves phase shifted 90 degrees from each other. Which excitation signal is supplied to the coil C1 or the coil C2 is determined by conditions of the position of coils C1, C2 against the rotor 2 and the rotating direction of the rotor 2.

When the needle or stopper piece 5 abuts the fixed stopper 6, cosine values of the above two phase waves are each set to 1 and 0 as an initial condition. In this condition, steps of excitation signals supplied to the coils C1, C2 are referred to as a stable step. Supplying such excitation signals to the coils C1, C2, the rotor 2 moves by changing the rotating pattern for each step. According to angle signals from a meter, the excitation signals are supplied in order of s0, s1, s2 or inversely in order of s0, s31, s30. The direction of rotation ofthe rotor is changed correspondingly to the supplied order of steps and the needle or stopper piece 5 connected with the output gear 4 finally is moved correspondingly to the rotating direction. If the rotor is magnetized equally alternately in N-pole and S-pole to pair of 5 poles, the output gear 4 rotates 2 degree per electric cycle at gear ratio 36:1. One electric cycle is formed with 32 equal steps and then the output gear 4 rotates 0.0625 degree by one step.

Figure 7:
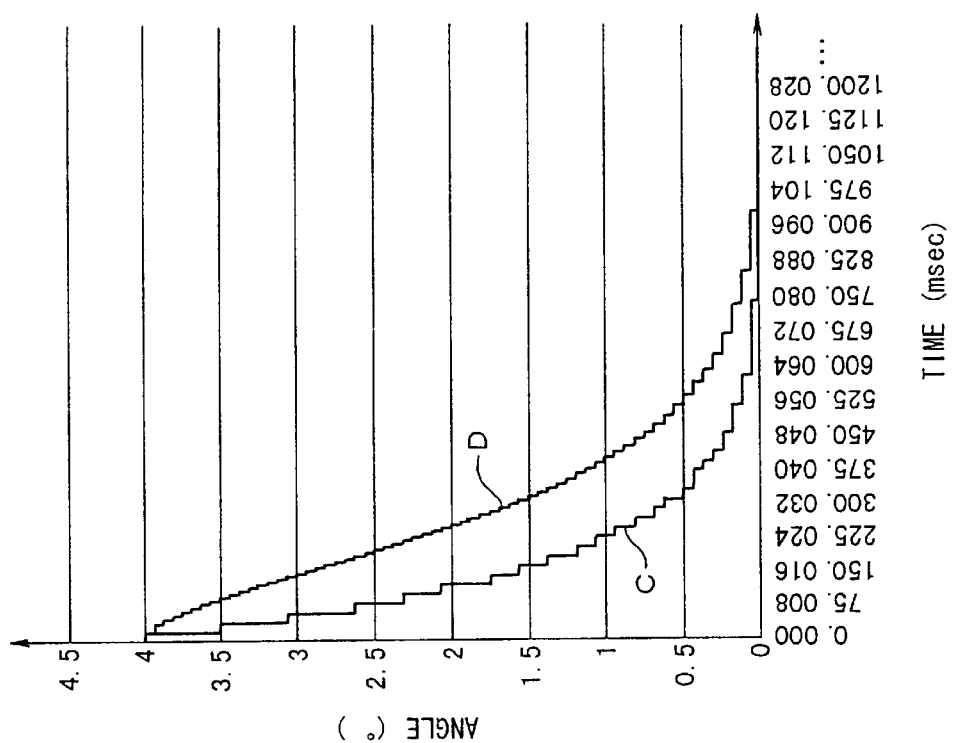
Figure 6:
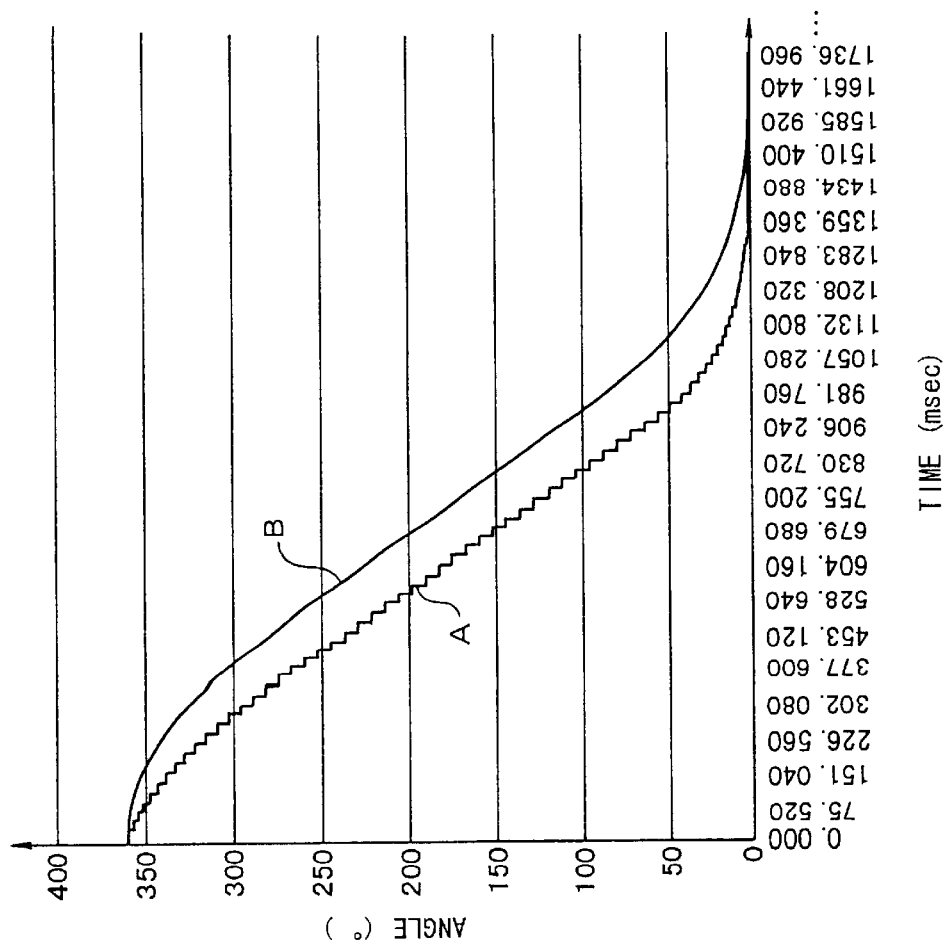

Forming the rotor into pair of 5 poles and one electric cycle into 32, steps as mentioned above, return-to-zero is accomplished smoothly, as shown in FIGS. 6, 7.

The excitation signals generated as mentioned above are not only for rotating toward the zero position at return-to-zero, but also are generated to rotate the rotor 2 clockwise or counterclockwise based on angle data generated by a car speed or the like. The same hardware and software can be used to generate the data by controlling angle data (corresponding to needle control signal in claims). Therefore, controlling rotor rotation during both conditions of return-to-zero and normal can be done by the same way and then processing data is simplified, and the load on CPU for controlling rotor rotation is reduced.

Processing to generate excitation signals on return-to-zero corresponds to a first excitation signal supply controlling means and processing to generate excitation signals on normal condition corresponds to a second excitation signal supply controlling means.

A speed filter 16 converts a speed pulse, supplied by said speed sensor 9, to angle data and outputs the data to the first filter 11.

A ROM 17 stores data required for CPU processing, such as a target angle data of excitation signals generated on return-to-zero. In the preferred embodiment, data 5760 and 64 corresponding to each 360 degree and 4 degree are stored therein. The reason of 360 degree and 4 degree will be described later.

The first, second and third filters 11, 12 and 13 have registers 1–8 for temporarily storing data generated during the above filtering process. A register 9 temporarily stores motor stable position data transferred from E2PROM 10 in the excitation signal generating process. Specific functions of these registers will be described clearly in FIGS. 2–5.

Figure 2:
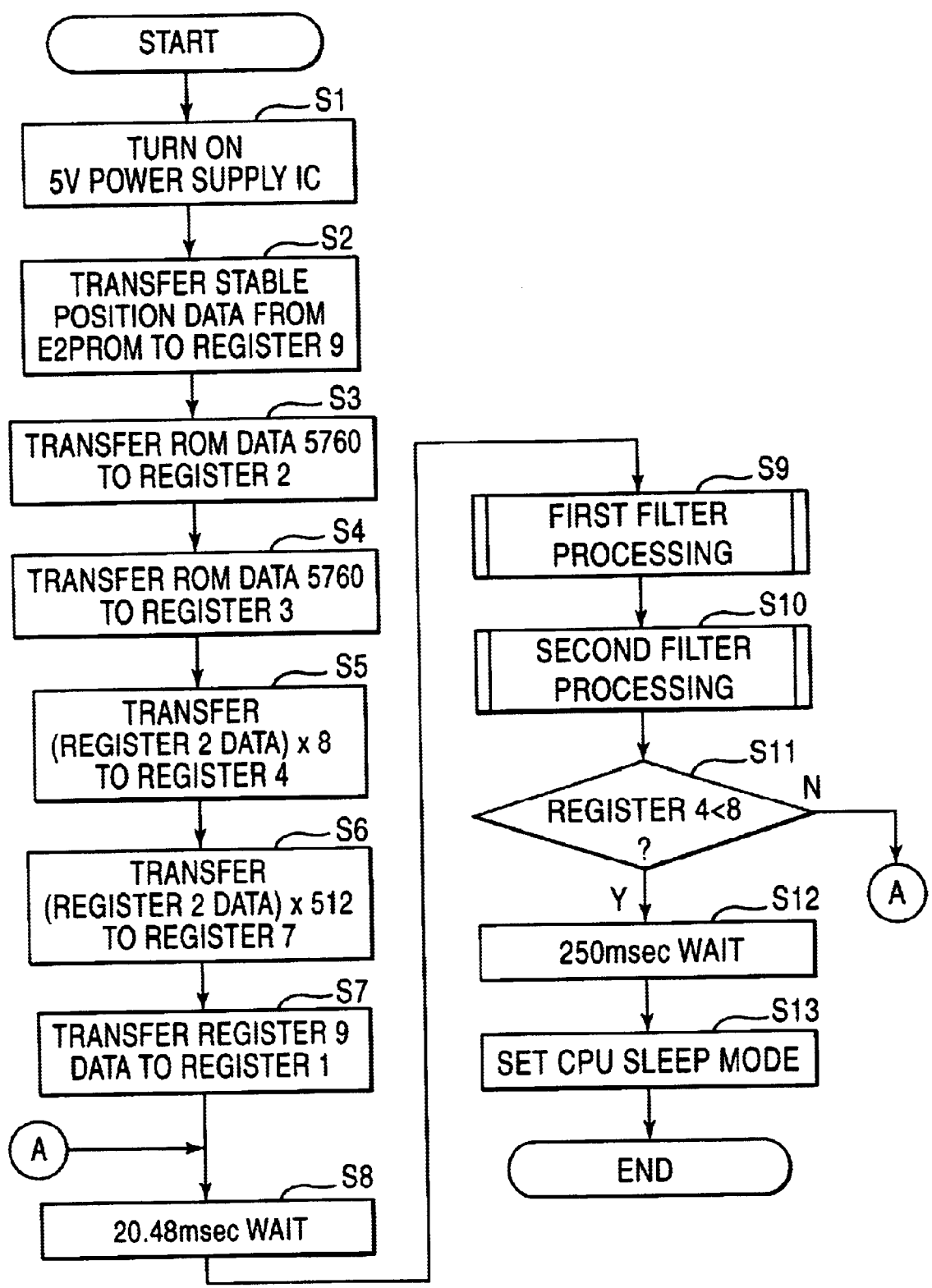
FIG. 2 is a flowchart, showing an example of a process by a CPU in FIG. 1 according to the preferred embodiment.
Figure 4:
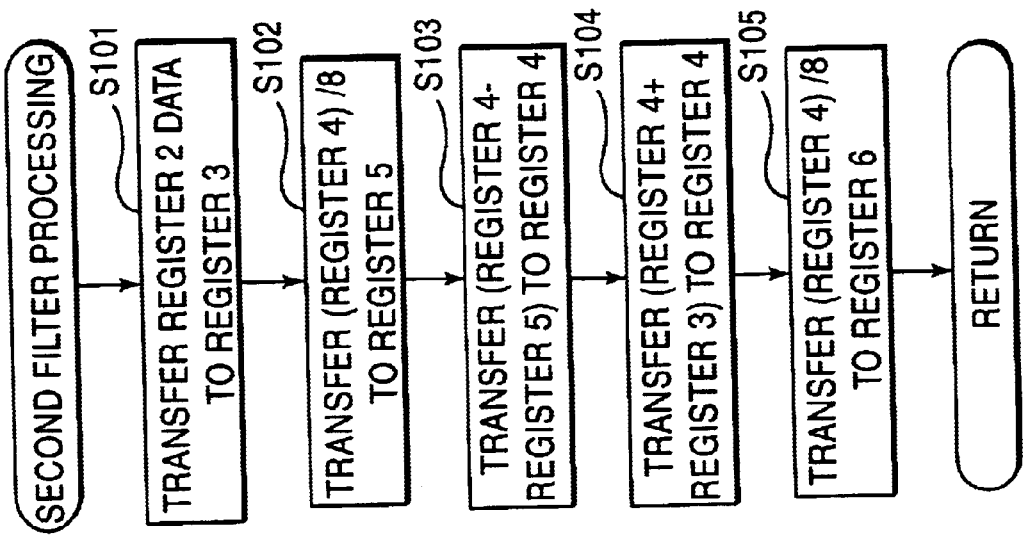
FIG. 4 is a flowchart, showing an example of the second filter processing in the flowchart shown in FIG. 2.
Figure 3:
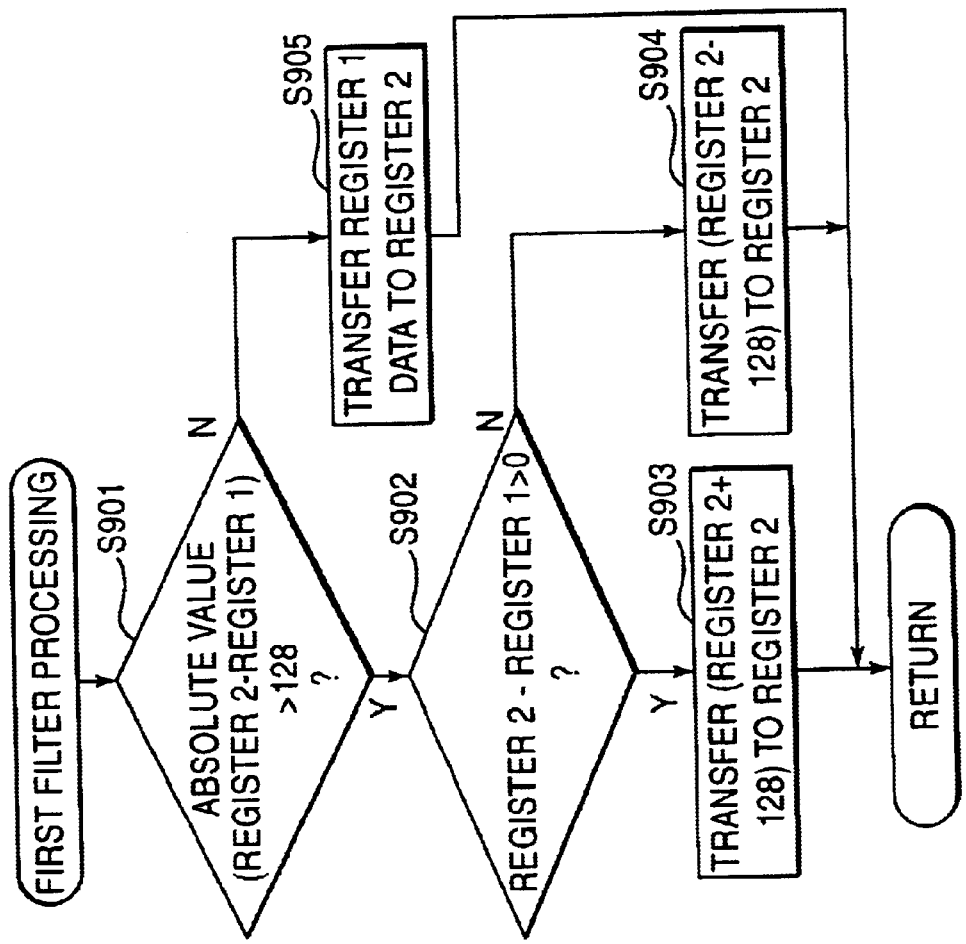
FIG. 3 is a flowchart, showing an example of the first filter processing in the flowchart shown in FIG. 2.
Figure 5:
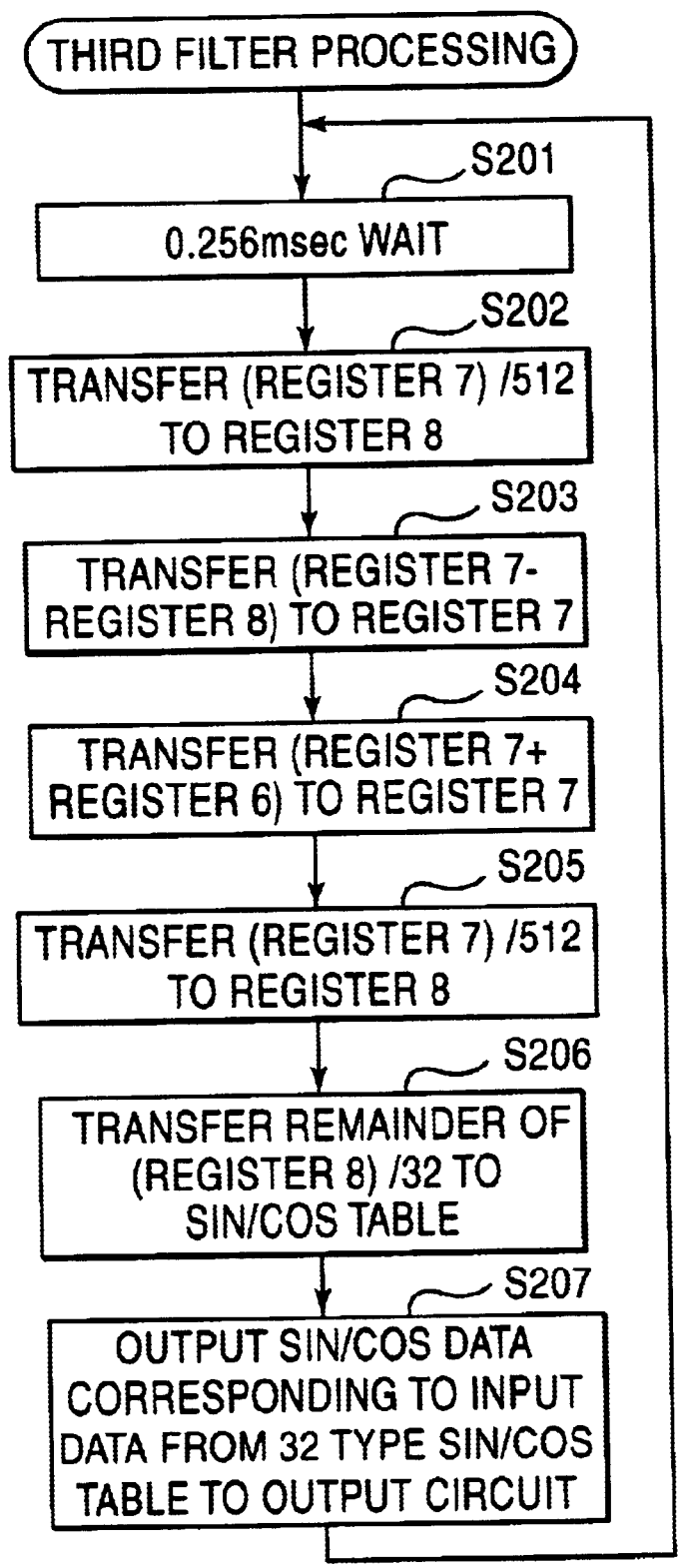
FIG. 5 is a flowchart, showing an example of the third filter processing according to process shown in FIG. 2.

The CPU processing in FIG. 1 according to the preferred embodiment, which is return-to-zero processing done at timing of battery turning ON and ignition turning ON or OFF, will be described with reference to FIGS. 2–5. FIG. 2 is a flowchart showing an example of the CPU processing in FIG. 1 according to the preferred embodiment. FIG. 3 is a flowchart showing an example of the first filter processing shown in the flowchart of FIG. 2. FIG. 4 is a flowchart showing an example of the second filter processing shown in the flowchart of FIG. 2. FIG. 5 is a flowchart showing an example of the third filter processing shown in the flowchart of FIG. 2.

Return-to-zero processing at battery turning ON is described first. As shown in FIG. 2, when turning ON of a 5V power supply IC 71 is sensed in step S1, the process proceeds to step S2. In step S2, a stable position data (stable step data) stored in the E2PROM 10 is transferred to the resister 9 and the process proceeds to step S3. In step S3, data 5760, corresponding to 360 degree, stored in a ROM 17 is transferred to the resister 2 and the process proceeds to step S4. In step S4, the data 5760 is transferred to the resister 3 and the process proceeds to step S5.

In step S5, data by multiplying data, stored in the resister 2, by 8 is transferred to the resister 4 and the process proceeds to step S6. In step S6, data by multiplying data, stored in the resister 2, by 512 is transferred to the resister 7 and the process proceeds to step S7. In step S7, data stored in the resister 9 is transferred to the resister 1 and the process proceeds to steps S8–S11.

In steps S8–S11, the first filter processing (step S9) and the second filter processing (step S10) are repeated every 20.48 msec (step S8) if data stored in the resister 4 is not smaller than 8 (N of step S11) and the process proceeds to step S12 when data stored in the resister 4 becomes smaller than 8 (Y of step S11). The first filter processing in step S9, as mentioned above, is basically to control the maximum rotating speed of a motor and an example will be described later with reference to FIG. 3. The second filter processing in step S12, as mentioned above, smooths motor rotation and an example will be described later with reference to FIG. 4.

After waiting 250 msec in step S12, the CPU is shifted to sleep mode in step S13 and all process is finished.

In the first filter processing shown in FIG. 3, as mentioned with reference to FIG. 1, when a remainder from subtracting an absolute value of previous angle data from an absolute value of new angle data is positive and 8 degree or more, the previous angle data added by 8 degrees is transferred to the second filter processing or, when the remainder is not over 8 degree, the new angle data is transferred to the second filter processing. When a remainder of subtracting an absolute value of previous angle data from an absolute value of new angle data is negative and 8 degree or more, the previous angle data subtracted by 8 degrees is transferred to the second filter processing or, when the remainder is not over 8 degree, the new angle data is transferred to the second filter processing.

With reference to FIG. 3, an absolute value of a remainder of subtraction of data stored in the register 2 and the register 1 is judged over 128 or not in step S901. If the absolute value is over 128, the process proceeds to step S902 (Y of step S901). If not (N of step 901), the process proceeds to step S905.

In step S902, a remainder of subtracting data stored in the resister 1 from data stored in the resister 2 is judged over zero or not. If the remainder is over zero (Y of step S902), the process proceeds to step S903. If not, the process proceeds to step S904. In step S903, data, stored in the register 2, added 128 is transferred to the resister 2 and the process returns to the main flowchart. In step S904, data, stored in the register 2, subtracted 128 is transferred to the register 2 and the process repeats.

In step S905, data, stored in the register 1 is transferred to the register 2 and the process In the second filter processing shown in FIG. 4, as mentioned with reference to FIG. 1, data changing is smoothed by ⅛ weighted-average filtering and transferred to the third filter processing.

With reference to FIG. 4, in step S101, data stored in the register 2 is transferred to the register 3 and the process proceeds to step S102. In step S102, data, stored in the register 4, divided by 8 is transferred to the register 5 and the process proceeds to step S103. In step S103, data of subtracting data stored in the register 5 from data stored in the register 4 is transferred to the register 4 and the process proceeds to step S104. In step S105, data of adding data stored in the register 4 to data stored in the register 3 is transferred to the register 4 and the process proceeds to step S105. In step S105, data, stored in the register 4, divided by 8 is transferred to the register 6 and the process repeats.

In the third filter processing shown in FIG. 5, as mentioned with reference to FIG. 1, data changing is smoothed by ¹⁄₅₁₂ weighted-average filtering about every 0.256 msec to prevent out-of-step of a stepping motor. The remainder of dividing the data by 32 is transferred to the SIN/COS table 14. The third filter processing is repeated about every 0.256 msec during the first and second filter processing with multi-programming or the like.

With reference to FIG. 5, after waiting 0.256 msec in step S201, in step S202, data of dividing data stored in the register 7 by 512 is transferred to the resister 8 and the process proceeds to step S203. In step S203, data of subtracting data stored in the register 8 from data stored in the register 7 is transferred to the register 7 and the process proceeds to step S204. In step S204, data of adding data stored in the register 7 to data stored in the register 6 is transferred to the register 7 and the process proceeds to step S205.

In step S205, data of dividing data stored in the register 7 by 512 is transferred to the register 8 and the process proceeds to step S206. In step S206, a remainder of dividing data stored in the register 8 by 32 is transferred to the SIN/COS table 14 and the process proceeds to step S207. In step S207, SIN/COS data given by the SIN/COS table 14 is transferred to the output circuit 15 and the process returns to step S201.

As mentioned above, the excitation signal corresponding to rotate the needle 360 degrees toward the zero position is supplied into the drive coils. Therefore, a needle of any meter is always set on the zero position securely because usually a needle does not rotate over a maximum of 360 degrees and the excitation signal corresponding to rotate the needle 360 degrees is supplied into the drive coils.

In the embodiment mentioned above, by a viewpoint of a needle of any meter not rotating over 360 degrees, the excitation signal corresponding to the maximum value of 360 degrees is supplied into the drive coils. If the maximum indicating angle, for example, 300 degrees, of a meter is known previously, supplying the excitation signal corresponding to 310 degrees into the drive coils, a needle can be set on the zero position securely and effectively. Thus, the value of excitation signals supplied at timing of a car battery ON may be fixed correspondingly to 360 degrees for assurance or may be adjusted occasionally such as correspondingly to 310 degrees.

Because a zero position setting can be done without sensing induced voltage at timing of battery ON, a time for returning a needle to a zero position is extremely reduced. Circuit structure is also simplified by requiring no sensing coil for induced voltage and no sensing circuit and then a unit size can be miniaturized. Advantageously, in case of using an inaccurate stepping motor or a stepping motor with a rotor having a large number of magnetized poles and a large reduction gear ratio, return-to-zero can be done securely. Furthermore, when connecting a vehicle battery or replacing it, this invention is very effective to set a zero position of a stepping motor.

Return-to-zero process at timing of ignition ON or OFF will be described next.

The processing at ignition ON can be done by altering steps S1, S3, S4 and S13 in return-to-zero process at battery ON, mentioned above. Regarding the process at ignition ON, IGN 8 is sensed ON in step S1. In steps S3 and S4, data 64 corresponding to 4 degrees, stored in the ROM 17, is transferred to the registers 2 and 3. In step S13, the process does not proceed to CPU sleep mode such as at battery ON but proceeds to needle control process in normal measuring mode. The 4 degrees is determined to rotate the output gear 4 two degree by one electric cycle. In general, a needle can be set in a zero position by one electric cycle, however in this embodiment, excitation signals corresponding to two electric cycles are supplied for assurance.

On the other hand, the processing at ignition OFF can be done by altering steps S1, S3 and S4 in return-to-zero process at battery ON, mentioned above. Regarding the process at ignition OFF, IGN 8 is sensed OFF in S1. In steps S3 and S4, data 64 corresponding to 4 degrees, stored in the ROM 17, is transferred to the registers 2 and 3.

Thus, by supplying excitation signals corresponding to double of one electric cycle to drive coils, a needle is almost always set on a zero position. Because a zero position setting can be accomplished without requiring to sensing of induced voltage, a needle continuously wobbling each time to turn ignition ON/OFF is enhanced and viewing is improved. Circuit structure is also simplified by requiring no sensing coil for induced voltage and no sensing circuit and then a unit size can be miniaturized.

In case of a needle control processing in normal measuring mode to control a needle correspondingly to a car speed or the like, by altering angle data for above return-to-zero into angle data corresponding to measurement value in above process from the end of processing at ignition ON to ignition OFF, needle control can be done similarly to the processing shown in FIGS. 1–5.

Examples of needle control result by above return-to-zero processing at battery ON and ignition ON will be shown. FIG. 6 is a graph showing an example of angle control by return-to-zero process at battery ON. FIG. 7 is graph showing an example of angle control by return-to-zero process at ignition ON.

In the example of angle control at battery ON, shown in FIG. 6, A is an example of angle control by the first and second filter and B is an example of angle control by all filters including the third filter. As shown in FIG. 6, 360-degree angle control by filtering with all filters including the third filter is done very smoothly. After the data by the first and second filter becomes zero, the data by the third filter becomes zero about 250 msec later.

In the example of angle control at ignition ON, shown in FIG. 7, C is an example of angle control by the first and second filter and D is an example of angle control by all filters including the third filter. As shown in FIG. 7, 4-degree angle control by filtering with all filters including the third filter is accomplished very smoothly.

In the present invention, the parameter values shown in FIGS. 1–5 may be not limited. For example, in case of a motor with large maximum pull-in pulse ratio (maximum drive pulse ratio for starting motor rotation) or large maximum pull-out pulse ratio (maximum drive pulse ratio to prevent out-of-step of rotating motor), the parameter values in FIGS. 1–5 can be adjusted occasionally.

Furthermore, pole locations of drive coils C1, C2 and fixed stopper position are not limited in this embodiment. Pole locations of drive coils C1, C2 and fixed stopper position can be altered occasionally.

What is claimed is:

1. A circuit for driving a stepping motor to control a needle position of a meter mounted in a vehicle by needle control signals, comprising:

an excitation signal generating means for generating excitation signals having one electrical cycle being formed by a plurality of excitation steps supplied in drive coils to rotate a rotor with N-poles and S-poles, magnetized equally and alternately, of said stepping motor; and a first excitation signal supply controlling means for controlling said excitation signal generating means to supply said excitation signals to said drive coils, wherein the needle is connected with the rotor through a speed change gear and rotates correspondingly to the rotor rotation, so that said excitation signals correspond to a needle rotating angle greater than a maximum needle rotating angle toward a zero position to respond to the needle control signals generated at a timing when a vehicle battery turns ON, wherein said excitation signal generating means comprises:

a filtering means for filtering the needle control signals to move the needle faster to the zero position;

a SIN/COS table for generating SIN/COS data corresponding to the excitation signal of micro-steps based on filtering result by means of the filtering means; and an output circuit for outputting excitation signals supplied into the drive coil as a required voltage value to rotate the rotor based on SIN/COS data by the SIN/COS table, wherein said filtering means comprises:

a first filter for filtering the needle control signals to add or subtract predetermined value corresponding to change values of the needle control signals;

a second filter for smoothing data change value to weighted-average filtering results by the first filter every predetermined time period; and a third filter for weighted-averaging filtering results by the second filter every predetermined time period to prevent out-of-step of said stepping motor and sending the data to said SIN/COS table.

2. A drive circuit for a stepping motor, for controlling position of a needle of a meter mounted in a vehicle by needle control signals, comprising;

an excitation signal generating means for generating excitation signals having one electrical cycle being formed by a plurality of excitation steps supplied in drive coils to rotate a rotor with N-poles and S-poles, magnetized equally and alternately, of said stepping motor; and a first excitation signal supply controlling means for controlling said excitation signal generating means to supply said excitation signals to said drive coils, wherein the needle is connected with the rotor through a speed change gear and rotates correspondingly to the rotor rotation, so that said excitation signals correspond to twice that of said one electrical cycle rotating toward a zero position to respond to the needle control signals generated at a timing when an ignition turns ON or OFF.

3. The drive circuit for a stepping motor according to claim 2, wherein said excitation signal generating means comprises:

a filtering means for filtering the needle control signals to move the needle faster to the zero position;

a SIN/COS table for generating SIN/COS data corresponding to the excitation signal of micro-steps based on filtering result by means of the filtering means; and an output circuit for outputting excitation signals supplied into the drive coil as a required voltage value to rotate the rotor based on SIN/COS data by the SIN/COS table.

4. The drive circuit for a stepping motor according to claim 3, wherein said filtering means comprises:

a first filter for filtering the needle control signals to add or subtract predetermined value corresponding to change values of the needle control signals;

a second filter for smoothing data change value to weighted-average filtering results by the first filter every predetermined time period; and a third filter for weighted-averaging filtering results by the second filter every predetermined time period to prevent out-of-step of said stepping motor and sending the data to said SIN/COS table.

5. The drive circuit for a stepping motor according to claim 1 or claim 4, wherein the rotor is magnetized equally alternately in N-pole and S-pole to pair of 5 poles, wherein the excitation signals are generated to be formed with equally-divided 32 excitation steps, based on sine wave shape.

6. The drive circuit for a stepping motor according to claim 1 or claim 2 comprising a second excitation signal supply controlling means for controlling the excitation signal generating means to supply to the drive coils the excitation signals for moving the needle in amount based on a measured signal toward the zero position or counter to the zero position, responding to the needle control signals generated based on the measured signals supplied by a measurement unit in the vehicle.

7. The drive circuit for a stepping motor according to claim 1, wherein an amount of the excitation signal corresponding to rotating the needle more than the maximum needle rotating angle is the amount necessary to rotate the needle 360 degrees.

\* \* \* \* \*